Sept. 2, 1958        E. E. WIECZOREK        2,850,592
REVERSIBLE MOTOR AND SWITCH FOR GARBAGE DISPOSAL UNITS
Filed Aug. 10, 1955        2 Sheets-Sheet 1
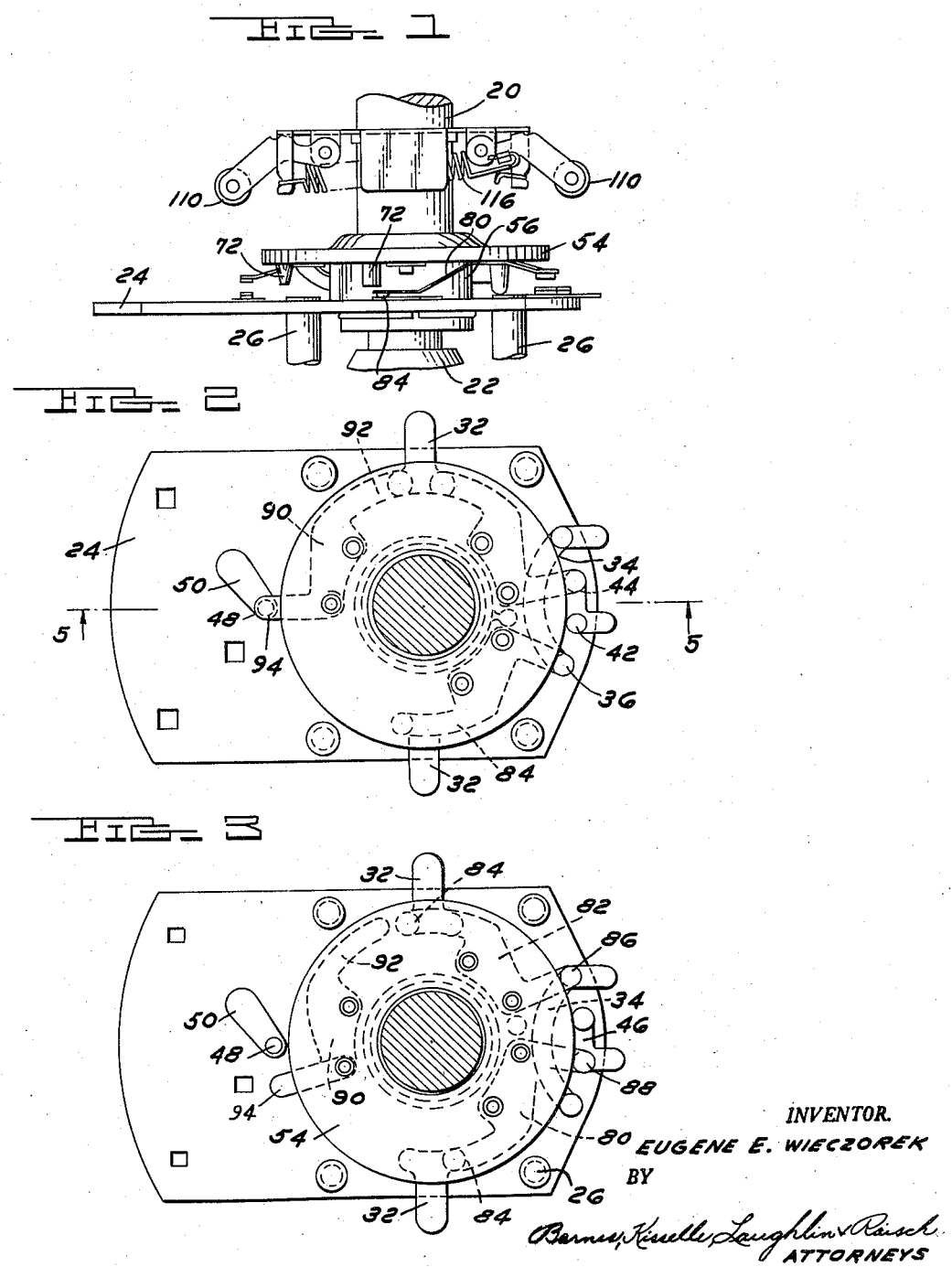
INVENTOR.
EUGENE E. WIECZOREK
BY
Barney, Kivelle, Laughlin & Raisch
ATTORNEYS Sept. 2, 1958  E. E. WIECZOREK  2,850,592
REVERSIBLE MOTOR AND SWITCH FOR GARBAGE DISPOSAL UNITS
Filed Aug. 10, 1955  2 Sheets-Sheet 2
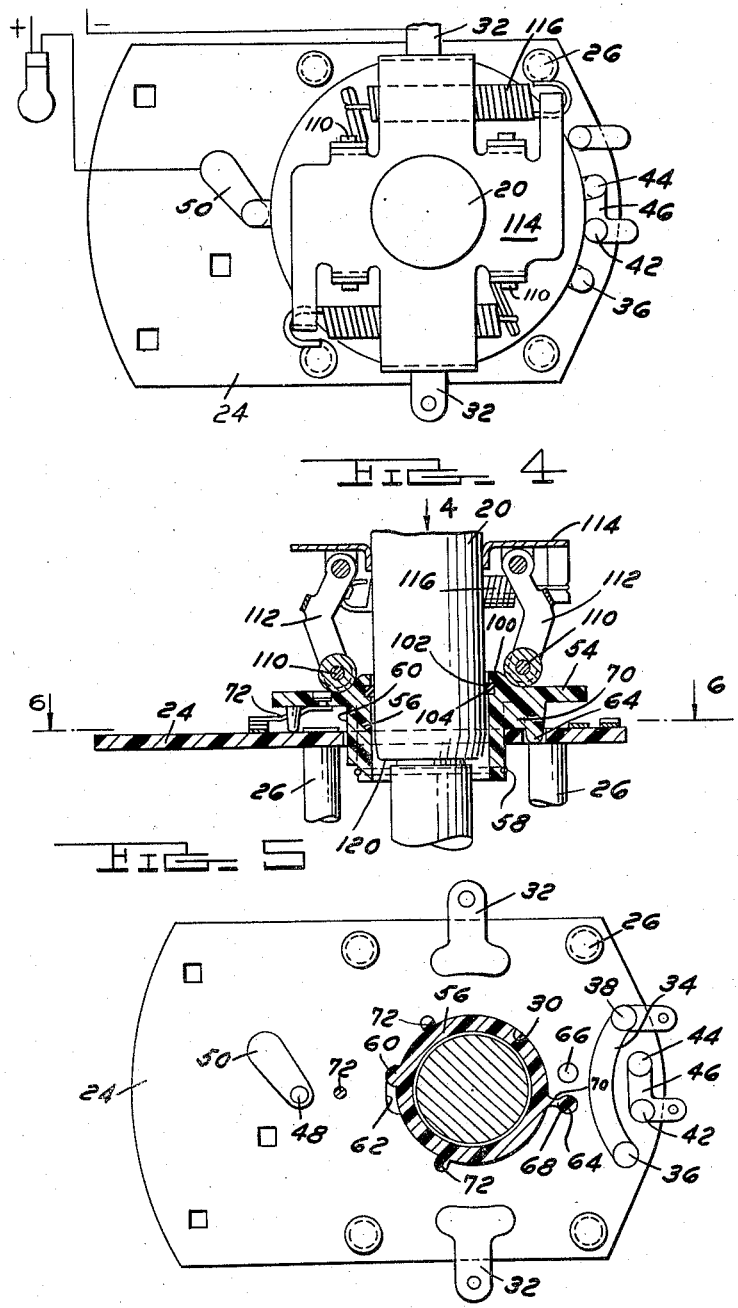
INVENTOR.
EUGENE E. WIECZOREK
BY
Barnes, Kisselle, Laughlin & Raisch
ATTORNEYS

United States Patent Office 2,850,592
Patented Sept. 2, 1958

2,850,592

REVERSIBLE MOTOR AND SWITCH FOR GARBAGE DISPOSAL UNITS

Eugene E. Wieczorek, Racine, Wis., assignor to In-Sink-Erator Manufacturing Company, Racine, Wis., a corporation of Wisconsin Application August 10, 1955, Serial No. 527,620

4 Claims. (Cl. 200—80)

This invention relates to a garbage disposal unit and particularly to a reversing switch control for such a unit which is self-actuating.

In Hammes Patent 2,701,855, dated February 8, 1955, there is a teaching of a reversible switch for a garbage disposal unit, the object being to operate the unit in a different direction each time the switch is actuated.

The present invention contemplates an improved construction on the switch disclosed in said patent, it being an object of the improved device to utilize electrical contacts as springs and also to provide a more positive direction control.

It is also an object to provide a reversing switch and supplemental control for reversible motors which is adaptable to additional switch functions as well as those of controlling the motor.

Other objects and features relating to the details of the construction and operation will be apparent in the following description and claims.

Briefly, the invention consists of a switch composed of axially spaced plates surrounding a shaft of the motor to be controlled, these plates being relatively movable in an axial and rotative direction. A centrifugal device also associated with the shaft and the motor functions to shift these plates axially relative to each other, particularly in the phase of the operation when the motor is slowing down and coming to rest. Current transmitting means connects the plates and serves also to urge the plates away from each other except when actuated by the centrifugal device, and a means is provided to associate one of said plates with the motor shaft wherein said plate will be shifted rotatably at the start of each cycle as soon as the shaft reaches a predetermined speed.

Drawings accompanying the specification, and the various views thereof may be briefly described as:

Figure 1, a side elevation of the assembled parts.

Figure 2, a plan view of the assembled plates.

Figure 3, a plan view similar to that of Figure 2 showing the rotative plates in shifted positioned relative to each other.

Figure 4, a plan view of the parts showing the centrifugal device.

Figure 5, a sectional view showing the centrifugal actuator in the at-rest position.

Figure 6, a plan view of the bottom plate on line 6—6 of Figure 5.

Referring to the drawings, in Figure 1 the shaft of an electric motor is shown at 20, the lower bearing of the shaft being mounted in a journal, a portion of which is shown at 22. The lower plate 24 of the switch assembly is mounted by suitable posts 26 at one end of the motor housing as shown in greater detail in Hammes Patent No. 2,701,855, dated February 8, 1955. The switch plate 24 is thus located in a stationary position relative to the shaft 20, and this plate is provided with a round opening 30 surrounding the shaft 20 and enlarged enough to have a substantial clearance with said shaft.

Plate 24 also has on each side electrical contact plates 32 in the shape of a small T-shaped conductive metal piece which is anchored with the bar of the T on diametrically opposed sides of the shaft opening 30. Ninety degrees from these plates 32 are two additional plates, one arcuate plate 34 having two contact buttons 36 and 38 and an L-shaped plate 46 having two contact buttons 42 and 44, each of these plates being formed of conductive material and being provided with suitable extended tabs for the attachment of conductive wires from a power circuit. An additional contact point 48 is located diametrically away from the plates 34 and 46 with a connecting tab 50.

Also concentric with the shaft is a second plate 54 having a depending collar 56 surrounding shaft 20 and extending through the opening 30 of plate 24. A snap ring 58 in a groove at the bottom of the collar 56 holds these two parts in relative assembly. A radial lug 60 acting in a small opening 62 in a plate 24 limits the rotative motion which is permitted between the two plates 24 and 54. A projection 64 is adapted to be positioned in one of two holes 66 and 68 of plate 24 in the two extreme positions of the plate 24. The axial motion of plate 54 toward plate 24 is also limited by a web portion 70 and three depending lugs 72 which project down the same distance from the plate 54 as the web 70.

Two double-pronged spanner leaf plates 80 and 82 affixed to the bottom of plate 54 have a double function. The ends 84 of these plates, which are diametrically opposed and positioned adjacent the contact plates 32, bend downwardly toward plate 24 and serve as a resilient spring to urge plate 54 away from plate 24 to the position shown in Figure 1. These ends 84 have a slightly dished portion to serve as a contact and bearing surface to ride on plates 32. The other ends of the spanner plates 80 shown at 86 and 88 are spaced apart and extend radially out from plate 54 to contact respectively the contacts 36 and 44 of plate 24 or the contacts 38 and 42.

A third plate 90 also has a depending leg 92 riding on plate 32 at one side of the plate 24, and the other end has a projecting contact 94 which co-operates with contact point 48 of the conductive plate 50.

The hub portion of plate 54 is raised slightly as shown at 100 in Figure 4, and within this raised portion an annular cavity 102 is provided to receive a felt ring 104 formed of fairly firm wear-resistant felt which lies in contact with shaft 20 as the parts are assembled. The raised collar 100 also has a shoulder portion connecting it with the top surface of plate 54, and this portion co-operates with the centrifugal rollers 110 which are pivoted on frames 112 mounted on a cage 114, which rotates with shaft 20.

As shown in Figure 1, the position of the rollers 110 during rotation is away from the plate 54 to permit the springs to raise the plate to the position shown disconnecting all the contact points of plate 24. As the shaft comes to rest, the frames 112 will lower by reason of the action of springs 116 and rollers 110 will cam the plate 54 down into its contact position.

The shaft 20 is enlarged in a tapered form 120 as shown in Figure 4 so that the felt ring 104 can be assembled readily on the shaft without damage to the felt. In the operation of the device, the drag of the felt on the shaft will cause rotation of the plate 54 to a new actuating switch position as soon as the rollers 110 are sufficiently removed from the plate to permit it to rise so that projection 64 is removed from one of the holes 66 or 68. Then, as the shaft comes to rest, the switch is in a different actuating position than the previous time the motor was started; and as the motor starts in the reverse direction, it will again rotate the plate 54 in the opposite direction due to the drag of the felt ring 104 and re-set the switch for starting in the original direction. Thus, there is a positive assurance that the switch will be reset immediately upon the starting of the motor so that even if the motor is stalled suddenly the switch will be set for a reversal operation.

In addition to use for garbage disposal units, this switch has also been found useful in a motor assembly for the operation of garage doors in the opening and closing motion; and in this connection a garage light can be associated in contact with the conductive plate 50 so that in one position, as shown in Figure 2, this light will be connected through plate 32 and in another position, shown in Figure 3, this light will be disconnected. The light will thus always be on, for example, in connection with a garage door application, when the door is opening. The remainder of the connections of the motor with the starting winding and running winding are the same as that disclosed in the Patent No. 2,701,855 above referred to.

I claim:

1. In a reversing switch combination to be used in connection with a shaft rotated by an electric motor controlled by said switch, which switch is the type having separable and relatively rotatable switch plates mounted adjacent the shaft, means on one of said plates having a frictional engagement with the other of said plates to conduct electricity from conductive means on one to conductive means on the other without impairing the relative rotation between the plates and serving also to urge said plates resiliently away from each other and means associating one of said plates with said shaft in a frictional relationship to cause rotation of said one plate relative to the other as a result of rotation of said shaft, the frictional engagement of said plate with said shaft being greater and sufficient to overcome the frictional engagement between the switch plates.

2. In a reversing switch combination to be used in connection with a shaft rotated by an electric motor controlled by said switch, which switch is the type having separable and relatively rotatable switch plates mounted adjacent the shaft, means on one of said plates having a frictional engagement with the other of said plates to conduct electricity from conductive means on one to conductive means on the other without impairing the relative rotation between the plates and serving also to urge said plates resiliently away from each other and means associating one of said plates with said shaft in a frictional relationship to cause rotation of said shaft, the frictional engagement of said plate with said shaft being greater and sufficient to overcome the frictional engagement between the switch plates, said first means comprising a double armed spanner leaf of resilient conductive material having a portion attached to one plate, and having one leg extending downwardly at an angle toward the other plate, and another leg extending downward at an angle toward said other plate, said first leg being positioned in contact with a conductive portion of said other plate at all times, and said second leg extending a shorter distance toward said other plate wherein said plates must be moved together for contact of said second leg, and means on said other plate for completing a circuit through both said legs when said plates are moved together, said first leg serving as a resilient means to bias said plates away from each other to prevent contacting of said second leg.

3. In a reversing switch combination to be used in connection with a shaft rotated by an electric motor controlled by said switch, which switch is the type having separable and relatively rotatable switch plates mounted adjacent the shaft, means on one of said plates having a frictional engagement with the other of said plates to conduct electricity from conductive means on one to conductive means on the other without impairing the relative rotation between the plates and serving also to urge said plates resiliently away from each other and means associating one of said plates with said shaft in a frictional relationship to cause rotation of said one plate relative to the other as a result of rotation of said shaft, the frictional engagement of said plate with said shaft being greater and sufficient to overcome the frictional engagement between the switch plates, said second means comprising a circular opening in one of said plates for receiving a shaft of an electric motor and an annular recess in the margin of said opening, an annular ring of frictional material, such as felt, located in said annular recess and having a frictional engagement with said shaft wherein movement of said shaft will shift said apertured plate in the direction of motion of said shaft, and means on said plates for restricting said motion to a limited degree.

4. In a reversing switch combination to be used in connection with a shaft rotated by an electric motor controlled by said switch, which switch is the type having separable and relatively rotatable switch plates mounted adjacent the shaft, means on one of said plates having a frictional engagement with the other of said plates to conduct electricity from conductive means on one to conductive means on the other without impairing the relative rotation between the plates and serving also to urge said plates resiliently away from each other and means associating one of said plates with said shaft in a frictional relationship to cause rotation of said one plate relative to the other as a result of rotation of said shaft, the frictional engagement of said plate with said shaft being greater and sufficient to overcome the frictional engagement between the switch plates, said first means comprising a double armed spanner leaf of resilient conductive material having a portion attached to one plate, and having one leg extending downwardly at an angle toward the other plate, and another leg extending downward at an angle toward said other plate, said first leg being positioned in contact with a conductive portion of said other plate at all times, and said second leg extending a shorter distance toward said other plate wherein said plates must be moved together for contact of said second leg, and means on said other plate for completing a circuit through both said legs when said plates are moved together, said first leg serving as a resilient means to bias said plates away from each other to prevent contacting of said second leg, said second means comprising a circular opening in one of said plates for receiving a shaft of an electric motor and an annular recess in the margin of said opening, an annular ring of frictional material, such as felt, located in said annular recess and having a frictional engagement with said shaft wherein movement of said shaft will shift said apertured plate in the direction of motion of said shaft, and means on said plates for restricting said motion to a limited degree.

References Cited in the file of this patent

UNITED STATES PATENTS

| | | |
|---|---|---|
| 2,598,440 | Reek | May 27, 1952 |
| 2,701,855 | Hammes | Feb. 8, 1955 |
| 2,734,957 | Beemer | Feb. 14, 1956 |